United States Patent
Byrne et al.

(10) Patent No.: US 9,607,038 B2
(45) Date of Patent: *Mar. 28, 2017

(54) DETERMINING LINKAGE METADATA OF CONTENT OF A TARGET DOCUMENT TO SOURCE DOCUMENTS

(71) Applicant: International Business Machines Corporation, Armonk, NY (US)

(72) Inventors: Brian P. Byrne, Austin, TX (US); Ivan M. Milman, Austin, TX (US); Martin A. Oberhofer, Bondorf (DE); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/840,952

(22) Filed: Mar. 15, 2013

(65) Prior Publication Data
US 2014/0281856 A1 Sep. 18, 2014

(51) Int. Cl.
*G06F 17/00* (2006.01)
*G06F 17/30* (2006.01)
*G06F 17/22* (2006.01)
*G06F 17/27* (2006.01)

(52) U.S. Cl.
CPC .... *G06F 17/30386* (2013.01); *G06F 17/2211* (2013.01); *G06F 17/2235* (2013.01); *G06F 17/2785* (2013.01)

(58) Field of Classification Search
CPC .......... G06F 17/30598; G06F 17/2785; G06F 17/30525
See application file for complete search history.

(56) References Cited

U.S. PATENT DOCUMENTS

| | | | | |
|---|---|---|---|---|
| 5,999,925 A | * | 12/1999 | Evans | G06F 17/30675 |
| 7,490,087 B2 | * | 2/2009 | Kumashio | G06F 17/30011 |
| 7,965,894 B2 | | 6/2011 | Tian et al. | |
| 7,979,413 B2 | | 7/2011 | Krishnamurthy et al. | |
| 8,010,538 B2 | * | 8/2011 | Pedersen | 707/749 |
| 8,156,092 B2 | | 4/2012 | Hewett et al. | |
| 8,239,750 B2 | * | 8/2012 | Thomsen | G06F 17/246 |
| | | | | 715/212 |

(Continued)

FOREIGN PATENT DOCUMENTS

| | | |
|---|---|---|
| EP | 0629972 A3 | 12/1994 |
| EP | 1739951 A1 | 1/2007 |
| JP | 2011109637 A | 6/2011 |

OTHER PUBLICATIONS

US Patent Application, dated Sep. 22, 2014, for U.S. Appl. No. 14/493,132, filed Sep. 22, 2014, entitled "Determining Linkage Metadata of Content of a Target Document to Source Documents", invented by B.P. Byrne, Total 32 pages.

(Continued)

*Primary Examiner* — Laurie Ries
(74) *Attorney, Agent, or Firm* — David W. Victor; Konrad, Raynes , Davda and Victor LLP (57) ABSTRACT

Provided are to a computer program product, system, and method for determining linkage metadata of content of a target document to source documents. In response to a determination that a target fragment in a target document matches a source fragment in a source document, linkage metadata is generated for the target fragment.

22 Claims, 8 Drawing Sheets

(56) References Cited

U.S. PATENT DOCUMENTS

| | | | |
|---|---|---|---|
| 2004/0001606 A1 | 1/2004 | Levy | |
| 2004/0098405 A1* | 5/2004 | Zrubek | G06F 17/3061 |
| 2005/0071743 A1* | 3/2005 | Harrington | G06F 17/30728 715/205 |
| 2005/0154761 A1* | 7/2005 | Lee | G06F 17/30997 |
| 2006/0074871 A1* | 4/2006 | Meyerzon | G06F 17/30864 |
| 2006/0101285 A1* | 5/2006 | Chen | G06F 21/602 713/193 |
| 2006/0101328 A1* | 5/2006 | Albornoz | G06Q 10/10 715/201 |
| 2006/0122983 A1* | 6/2006 | King et al. | 707/3 |
| 2006/0149706 A1* | 7/2006 | Prang | G06F 17/30595 |
| 2006/0259854 A1* | 11/2006 | Walker | G06F 17/2229 715/234 |
| 2007/0011134 A1* | 1/2007 | Langseth et al. | 707/1 |
| 2007/0011183 A1* | 1/2007 | Langseth et al. | 707/101 |
| 2007/0022374 A1* | 1/2007 | Huang | G06F 17/30722 715/205 |
| 2007/0055926 A1* | 3/2007 | Christiansen | G06F 17/241 715/210 |
| 2007/0271340 A1* | 11/2007 | Goodman | G06Q 10/107 709/206 |
| 2008/0040388 A1 | 2/2008 | Petri et al. | |
| 2008/0115083 A1* | 5/2008 | Finkelstein | G06F 17/30 715/805 |
| 2008/0140679 A1* | 6/2008 | Deyo et al. | 707/100 |
| 2008/0307228 A1 | 12/2008 | Faria | |
| 2009/0164427 A1 | 6/2009 | Shields et al. | |
| 2009/0313226 A1* | 12/2009 | Bennett | G06F 17/30864 |
| 2009/0322756 A1* | 12/2009 | Robertson et al. | 345/440 |
| 2011/0029491 A1* | 2/2011 | Joshi et al. | 707/692 |
| 2011/0078165 A1* | 3/2011 | Battle | G06F 17/2229 707/756 |
| 2011/0138269 A1* | 6/2011 | Cordonnier | G06F 17/30569 715/239 |
| 2011/0271232 A1* | 11/2011 | Crochet et al. | 715/810 |
| 2011/0296291 A1* | 12/2011 | Melkinov | G06F 17/2229 715/229 |
| 2012/0117080 A1* | 5/2012 | Lamanna | G06F 17/30613 707/747 |
| 2013/0232160 A1* | 9/2013 | Tibble | 707/758 |
| 2013/0235084 A1* | 9/2013 | Wu | G06F 3/14 345/660 |
| 2014/0074843 A1* | 3/2014 | White | G06Q 10/107 707/737 |
| 2014/0089773 A1* | 3/2014 | Eames | G06T 11/60 715/210 |
| 2014/0189526 A1* | 7/2014 | Chen | G06F 17/30368 715/745 |
| 2014/0229874 A1* | 8/2014 | Strauss | G06Q 50/08 715/771 |

OTHER PUBLICATIONS

Preliminary Amendment, dated Sep. 22, 2014, for U.S. Appl. No. 14/493,132, filed Sep. 22, 2014, entitled "Determining Linkage Metadata of Content of a Target Document to Source Documents", invented by B.P. Byrne, Total 7 pages.

English Abstract for JP2011109637A, published on Jun. 2, 2011, Total 2 pp. [Includes English Counterpart U.S. Pat. No. 7,965,894.].

Heintze, N., "Koala Document Fingerprinting (KDF)", [online], [Retrieved on Feb. 6, 2013]. Retrieved from the Internet at <URL: http://www.cs.cmu.edu/afs/cs/user/nch/www/koala-info.html>, 1995 Nevin Heintze, Total 2 pp.

Heintze, N., "Scalable Document Fingerprinting (1996)", [online], [Retrieved on Feb. 6, 2013]. Retrieved from the Internet at <URL: http://citeseerx.ist.psu.edu/viewdoc/summary?doi=10.1.1.38. 8072>, Proceedings of the Usenix Workshop on Electronic Commerce, 1996, Total 2 pp.

Heintze, N., "Scalable Document Fingerprinting (Extended Abstract)", 1995, Total 10 pp.

Krishnamurthy, B., S. Kumar, A. Sharma, and L. Subramanian, "Detecting Bulk Document Leakage", Download date: Feb. 6, 2013, Total 13 pp.

Office Action, dated Mar. 11, 2016, for U.S. Appl. No. 14/493,132, filed Sep. 22, 2014, invented by B.P. Byrne et al., Total 15 pages.

Response to Office Action, dated Jun. 13, 2016, for U.S. Appl. No. 14/493,132, filed Sep. 22, 2014, invented by B.P. Byrne et al., Total 10 pages.

Notice of Allowance, dated Sep. 23, 2016, for U.S. Appl. No. 14/493,132, filed Sep. 22, 2014, invented by B.P. Byrne et al., Total 6 pages.

* cited by examiner

FIG. 1

FIG. 2 — Source Document Record

FIG. 3 — Source Fragment Record

FIG. 4 — Target Document Record

Target Fragment Record

FIG. 5 — Linkage Metadata

DETERMINING LINKAGE METADATA OF CONTENT OF A TARGET DOCUMENT TO SOURCE DOCUMENTS

BACKGROUND OF THE INVENTION

1. Field of the Invention

The present invention relates to a computer program product, system, and method for determining linkage metadata of content of a target document to source documents.

2. Description of the Related Art

Often a target document needs to be compared against other source documents to determine if the target document has content matching or copied from the source documents. For instance, the source documents may comprise sensitive organizational documents which are confidential to the organization, such as a corporation or government body. However, sensitive documents often tend to propagate freely within an organization and across the organization network boundaries onto the Internet. One particular problem is when a sensitive document with proprietary, competitive or private information is leaked outside the organization without authorization.

In addition to the organizational and corporate setting, various services are available to determine whether a student paper has plagiarized documents in a database of papers. One such student plagiarism detection service is Turnitin (see turnitin.com).

Known techniques to determine whether a target document has copied content from other source documents, such as sensitive corporate documents or papers, involve comparing the content of the target document with the source document.

One technique for determining textual relatedness is Koala Document Fingerprinting (KDF), which has been used to determine the relatedness of computer science research documents such as technical reports, conference papers and journal articles. In a Koala search technique, the document (URL) is loaded to the KDF server as a textual representation. Then, using this text, a fingerprint of the document is generated. Finally, this fingerprint is matched against the current document fingerprint database to find related documents.

SUMMARY

Provided are to a computer program product, system, and method for determining linkage metadata of content of a target document to source documents. In response to a determination that a target fragment in a target document matches a source fragment in a source document, linkage metadata is generated for the target fragment.

DETAILED DESCRIPTION

A source document may be copied freely and modified many times between the time when it was originally authored and the time that it is viewed by any given party. In the context of leaked materials, this linkage of a target document to its source may be deliberately obscured to prevent the determination of the source of a leaked target document.

Described embodiments compare document content from a target document against a database of content of known source documents to identify a possible origin of fragments of the target document content. Potential linkage metadata from matches in the target document content are determined based on knowledge of the origin of the content from the source documents, such as the lineage of the documents, may be verified to arrive at a likely origin of leaked content. The derived knowledge of the linkage metadata may be used to populate known document content to act as an input in further linkage metadata determinations.

Described embodiments provide techniques to determine if content from a target document matches content in one or more source documents. Further, the described embodiments determine linkages among target fragments and source documents having source fragments matching the target fragments to provide the user information on how the target fragments relate to one or more source documents having the matching or copied source fragment. This allows a determination of the lineage of a target fragment with respect to source documents.

Figure 1:
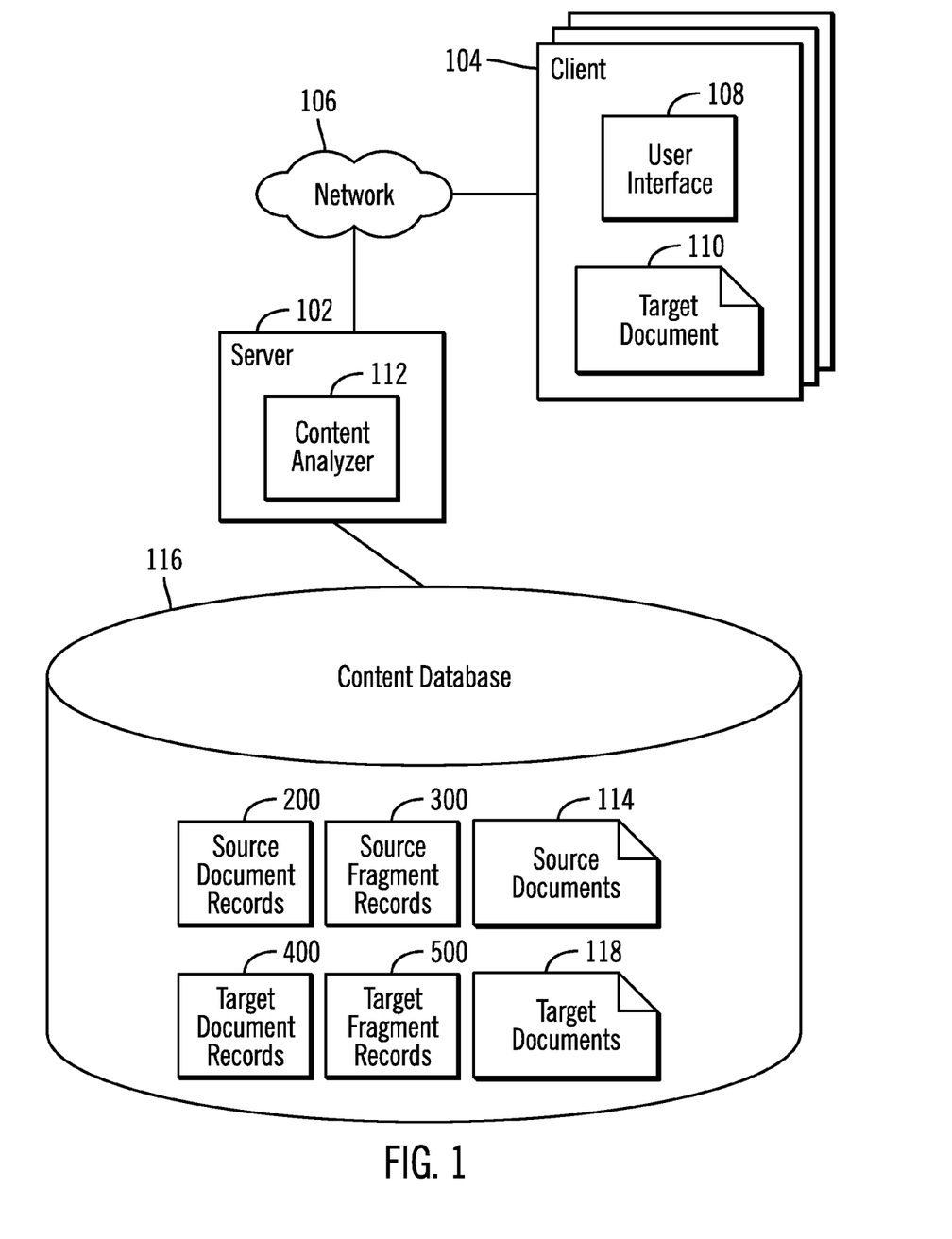
FIG. 1 illustrates an embodiment of a computing environment.

FIG. 1 illustrates an embodiment of a computing environment including a server 102 and client systems 104 that communicate over a network 106. The client systems 104 may include a user interface 108 to submit a target document 110 to a content analyzer 112 implemented in the server 102 to determine whether the target document 110 has content matching content from source documents 114 maintained in a content database 116. For instance, the source documents 114 may comprise confidential information and the entity operating the content analyzer 112, such as a corporation, educational institution, government agency, etc., may want to determine whether the target document 110 has content copied from one of the organizational source documents 114 that were intended to be confidential. In an alternative embodiment, the source documents 114 may comprise content from books and authored papers on various topics and the content analyzer 112 may determine whether the submitted target document 110 has content matching the source documents 114 to determine whether plagiarism has occurred. The content analyzer 112 may also analyze target document 110 to determine if there is matching content for other purposes, such as for research to assist with referencing of content, etc.

The content database 116 includes source documents 114 having content to compare against received target document 110. The content database 116 may further store previously received target documents 110, including the submitted target document 110 from clients 104. The content analyzer 112 generates source document records 200 having information on the source documents 114 to use in comparison operations; target document records 400 having information on target documents 118 being examined for copying from the source documents 114; source fragment records 300 having information on fragments or portions of the source documents 114; and target fragment records 500 having information on fragments of the target documents 118 and their relation to source documents.

The content analyzer 112 may be implemented as code in a computer readable storage medium executed by a processor. Alternatively, the content analyzer 112 may be implemented with hardware logic, such as an Application Specific Integrated Circuit (ASIC).

The content database 116 may be implemented in a storage comprising one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 106 may comprise a network such as one or more interconnected Local Area Networks (LAN), Storage Area Networks (SAN), Wide Area Network (WAN), peer-to-peer network, wireless network, etc.

Figure 2:
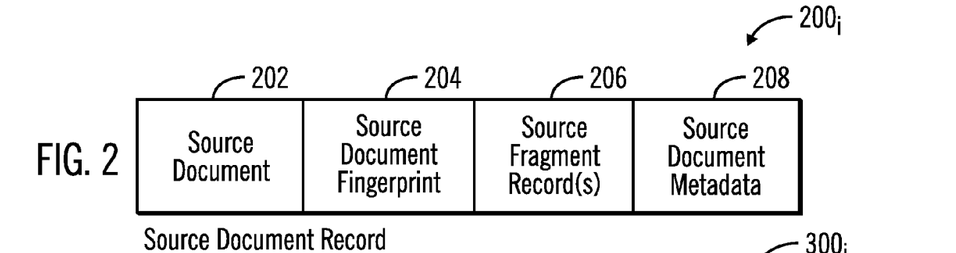
FIG. 2 illustrates an embodiment of a source document record.

FIG. 2 illustrates an embodiment of an instance $200_i$ of one of the source document records 200 including a source document 202; a source document fingerprint 204 calculated by processing the content of the source document 202 to uniquely identify the document based on the content of the document; source fragment record(s) 206 for one or more fragments of content in the source document 202; and source document metadata 208 on the source document 202, such as the author, timestamp of creation, last modification, organization, publication date, etc. In one embodiment, lexical analysis may be performed to determine fragments of the source document content based on the structure of the document. The source document fingerprint 204 may be calculated by applying a checksum, hash function or fingerprint algorithm, such as Koala Document Fingerprinting (KDF), Rabin's fingerprinting algorithm, etc.

Figure 3:
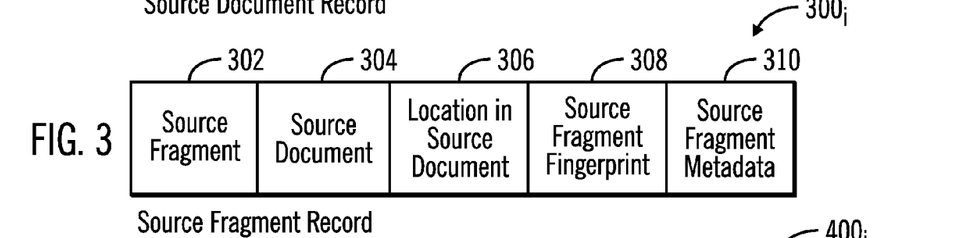
FIG. 3 illustrates an embodiment of a source fragment record.

FIG. 3 illustrates an embodiment of an instance $300_i$ of one of the source fragment records 300 which may be listed in field 206 of the source document record $200_i$. The source fragment record $300_i$ may include: a source fragment 302; a source document 304 containing the source fragment 302; a location in the source document 306 of the source fragment 302; a source fragment fingerprint 308 calculated from the source fragment 302 of content in the source document 304 using an algorithm, such as the algorithm used to generate the source document fingerprint 204; and source fragment metadata 310. The source fragment metadata 310 may include the source document metadata 208 or fragment specific information, such as if a specific author created that fragment within the source document. A fragment may comprise any lexical parsed unit of the text that is a component of a document, such as a paragraph, section, sentence, group of sentences, etc. Metadata for the source and target documents may be encoded in the document through a schema or maintained separately from the document.

Figure 4:
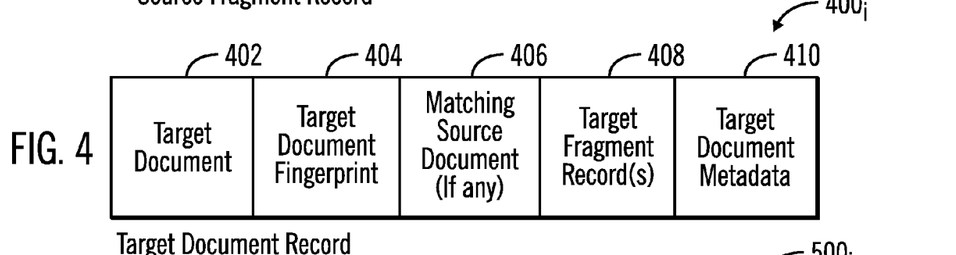
FIG. 4 illustrates an embodiment of a target document record.

FIG. 4 illustrates an embodiment of an instance $400_i$ of one of the target document records 400 including a target document 402; a target document fingerprint 404 calculated by processing the content of the target document 402 using the same process used to calculate the source document fingerprint 204; a matching source document 406, if any, having a matching document fingerprint 204; one or more target fragment records 408 having information on target fragments in the target document 402; and target document metadata 410 having document level metadata.

Figure 5:
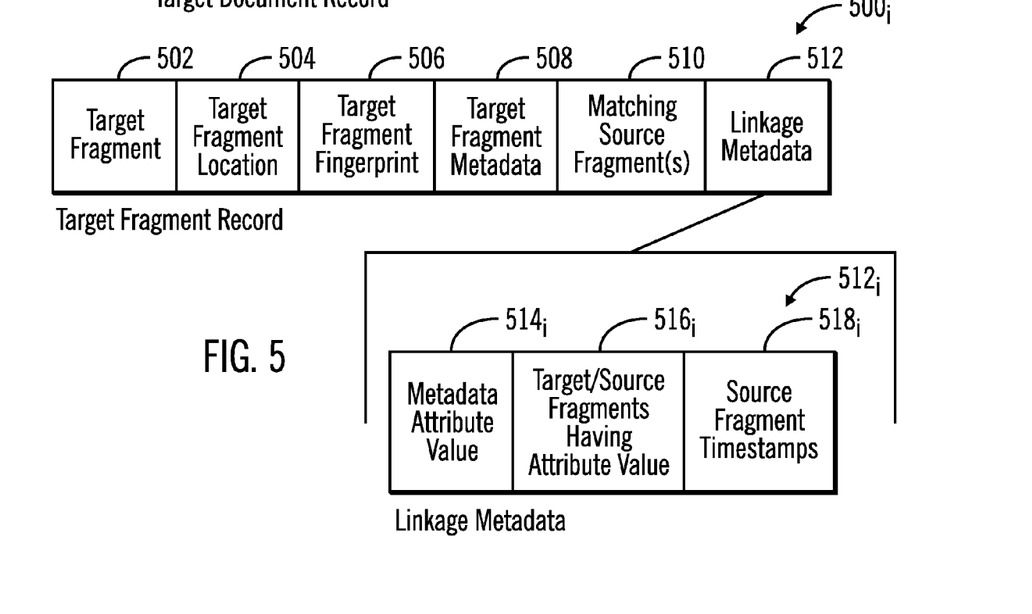
FIG. 5 illustrates an embodiment of a target fragment record.

FIG. 5 illustrates an embodiment of an instance $500_i$ of one of the target fragment records 500 generated for each determined fragment of the target document 402 including a target fragment 502 from one target document 402, which would be indicated in the target fragment records 408 of one target document record $400_i$; a target fragment location 504 indicating a location of the target fragment 502 in the containing target document 402; a target fragment fingerprint 506 calculated from the target fragment content; target fragment metadata 508, such as the author of the fragment or target document 402; one or more matching source fragments 510 indicating, if any, one or more source fragments having content matching the content of the target fragment 502, as determined by matching fragment fingerprints 308, 506. If there is a matching source fragment 510, then the target fragment record $500_i$ includes one or more linkage metadata 512, where each linkage metadata 512 indicates at least two fragments of the target and source fragments having matching metadata value. Each linkage metadata instance $512_i$ associates a metadata attribute value $514_i$ and the target and/or source fragments $516_i$ having the matching metadata attribute value $514_i$ and the source fragment timestamps $518_i$ that may be used to order the target and/or source fragments $516_i$ having the matching metadata attribute value $514_i$. The source fragments associated with the same linkage metadata $512_i$, having the same metadata attribute value $514_i$, may be in the same or different source documents. Further, once linkage metadata 512 is created it may be used to determine links to other source documents when identifying the target fragment record 500*i* for the source fragment being considered. Further, the linkage metadata 512 determined for a target fragment may then be part of the source fragment metadata 310 when the target fragment and document are stored as a source fragment and document, thus forming source linkage metadata.

The matching metadata attribute values $514_i$ used to form linkage metadata 512 may comprise at least one of an author of the source fragments, a source document having the source fragments, and a date of the source fragments. In certain situations, a linkage metadata instance $512_i$ may associate the target fragment with one or more source fragments having a matching attribute value. Alternatively, the linkage metadata 512*i* may associate source fragments and not the target fragment if the target fragment does not have the metadata attribute value $514_i$ of the linkage metadata 512*i*. Further, the target fragment and combinations of one or more of the source fragments may be associated in multiple linkage metadata instances, e.g., $512_i$, $512_j$, if they have the metadata attribute values of multiple linkage metadata instances.

FIGS. 2-5 provide an arrangement of data in data structures in records. In alternative embodiments, the information described in the records of FIGS. 2-5 may be arranged in alternative records and data structures, with additional data, than those described. Further, the elements described in the fields of the records of FIGS. 2-5 may comprise a reference or identifier of the element or the actual element itself.

Figure 6:
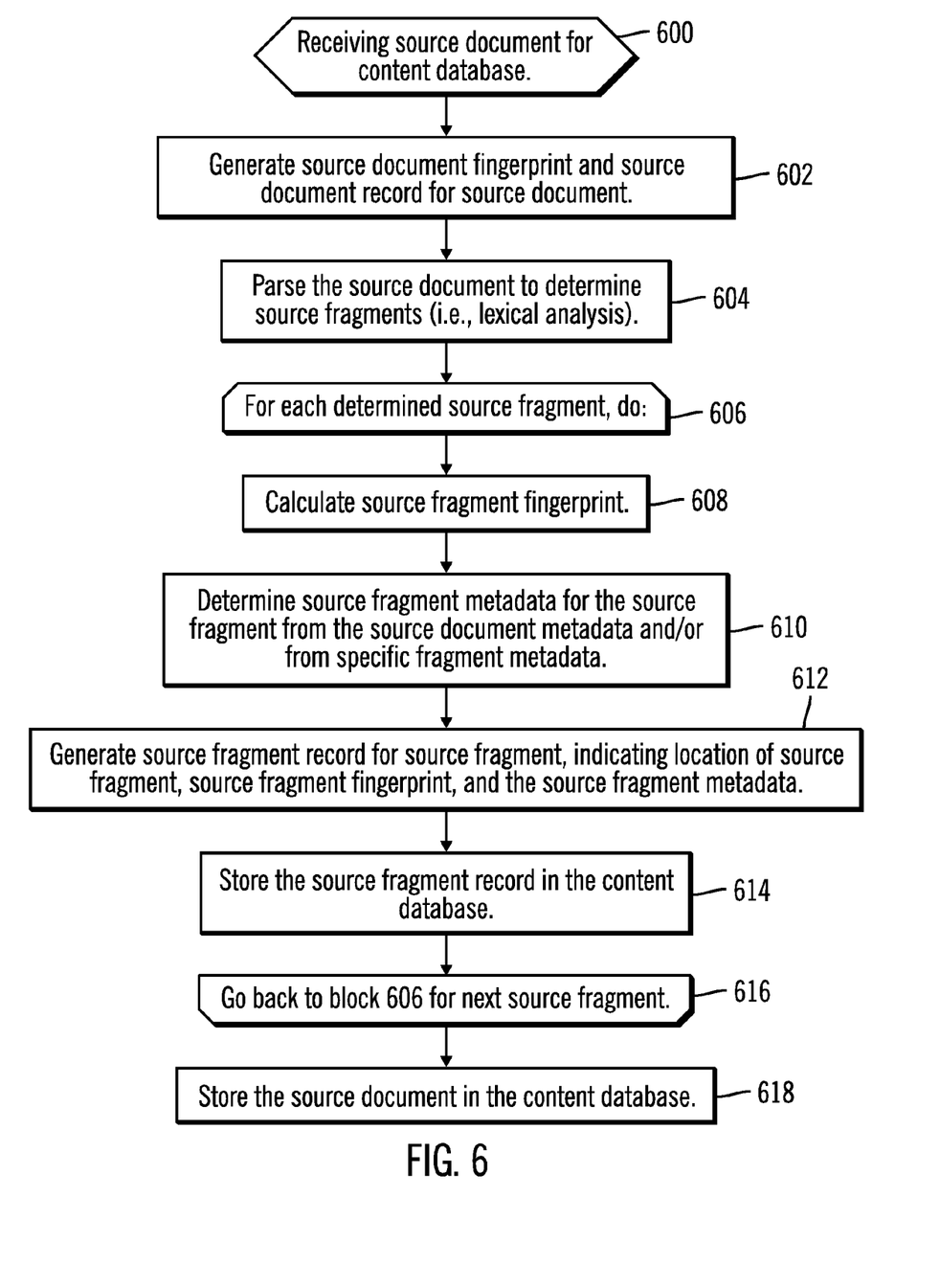
FIG. 6 illustrates an embodiment of operations to add information on a source document to a content database.

FIG. 6 illustrates an embodiment of operations performed by the content analyzer 112 to generate source document records 200 and source fragment records 300 from source documents 114 having the content that the operator of the content analyzer 112 wants to prevent copying, such as prevent confidential document leakage or to prevent plagiarism. Upon receiving (at block 600) a source document 114 to add to the content database 116, the content analyzer 112 generates (at block 602) a source document fingerprint 204 based on all the content of the source document 114 and creates a source document record $200_i$ (FIG. 2) for the received source document 114. The content analyzer 112 parses (at block 604) the source document 114 to determine source fragments of content. For each determined source fragment, the content analyzer 112 performs a loop of operations at blocks 606 through 616. For each determined source fragment, the content analyzer 112 calculates (at block 608) a source fragment fingerprint 308. Source fragment metadata 310 is determined (at block 610) from the source document metadata and/or fragment specific metadata, such as if the source fragment has a different author than other fragments. The content analyzer 112 generates (at block 612) a source fragment record $300_i$ for a source fragment 302, indicating a location 306 of the fragment in the source document 114, the calculated fragment fingerprint 308, and the determined metadata 310 for the fragment. The generated source fragment record $300_i$ is stored (at block 614) in the content database 116. Further, the source document 114 is stored (at block 618) in the content database 116.

Figure 7A:
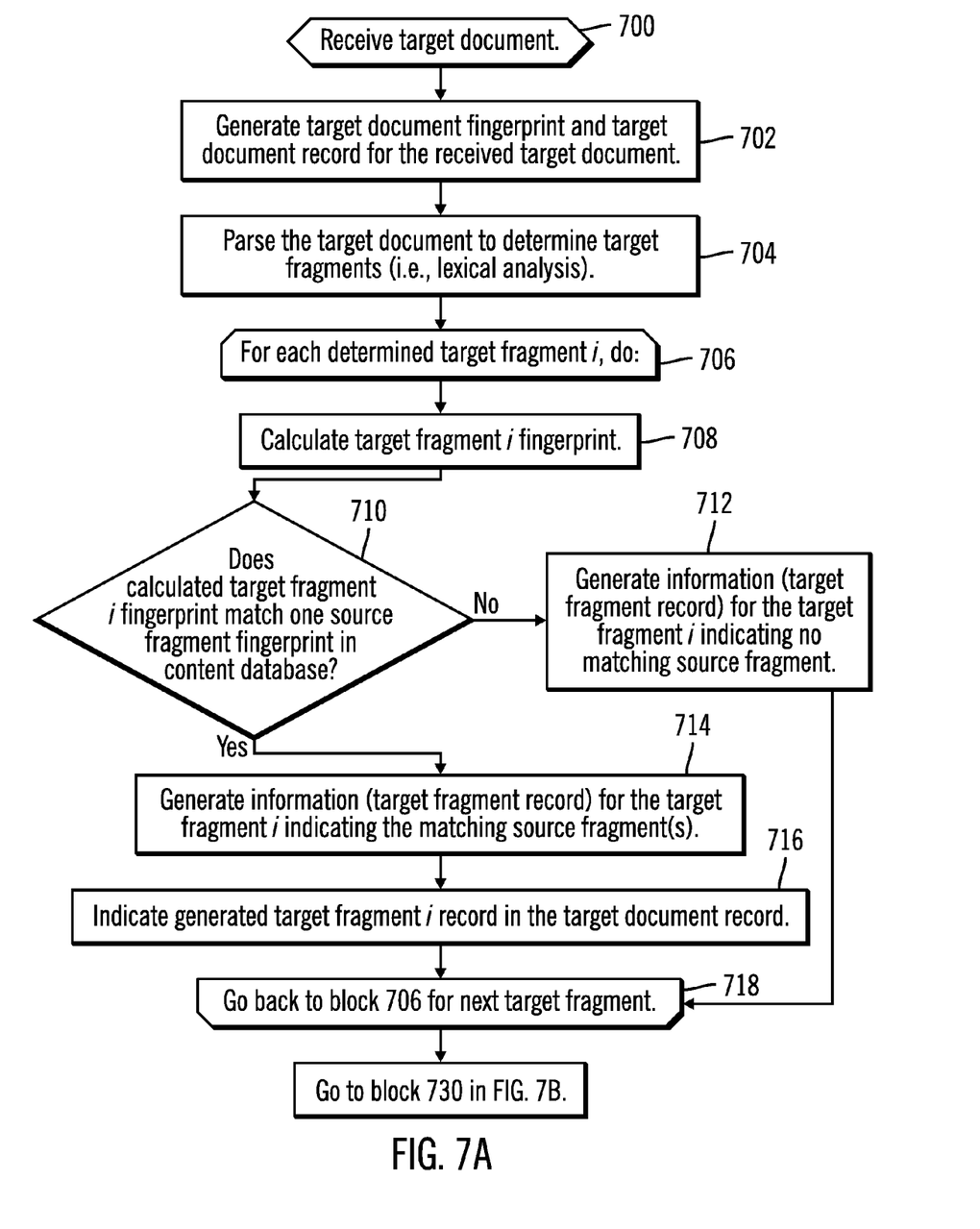
FIGS. 7a, 7b, and 7c illustrate an embodiment of operations to generate target fragment records and the linkage among the target fragments.
Figure 7B:
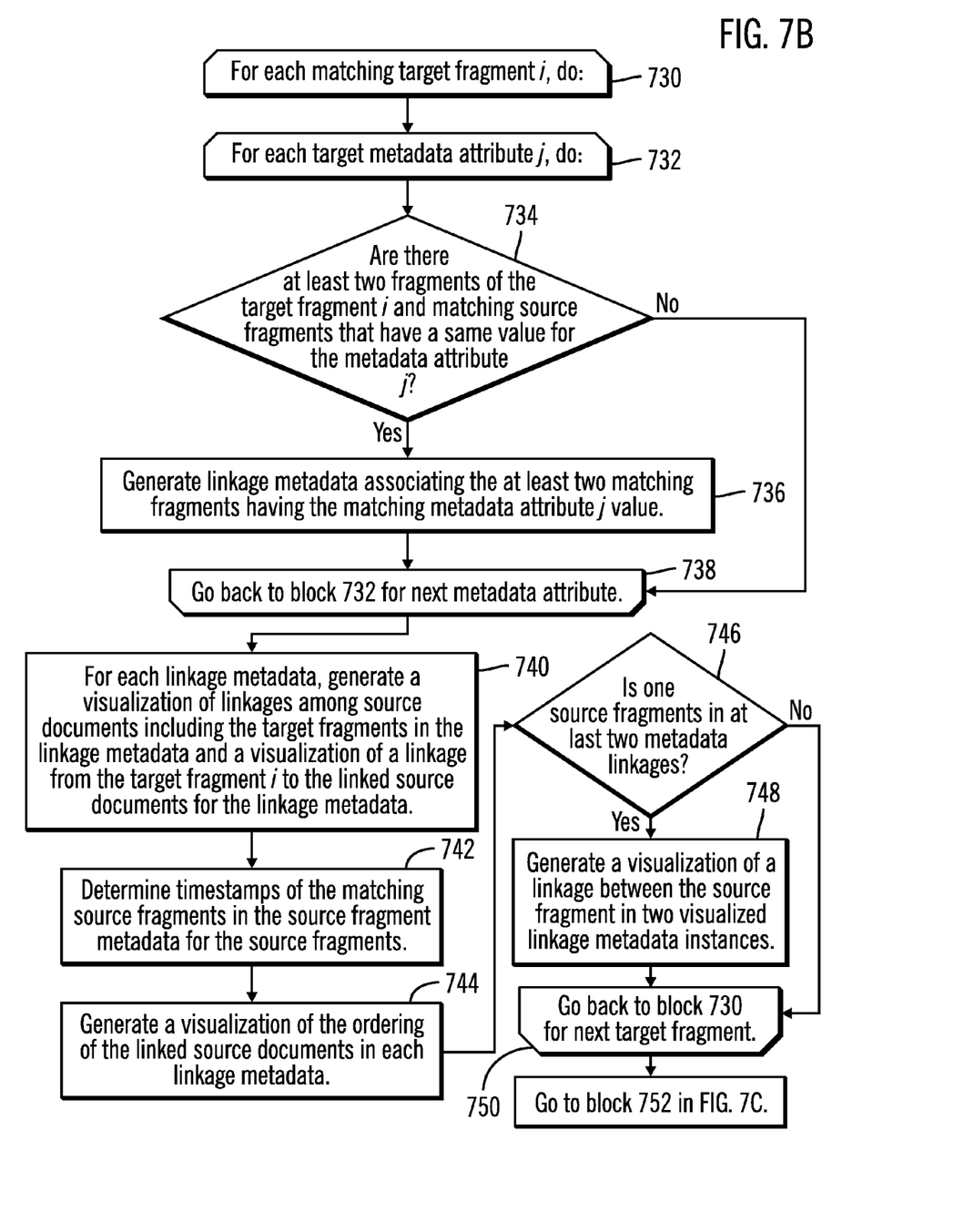
Figure 7C:
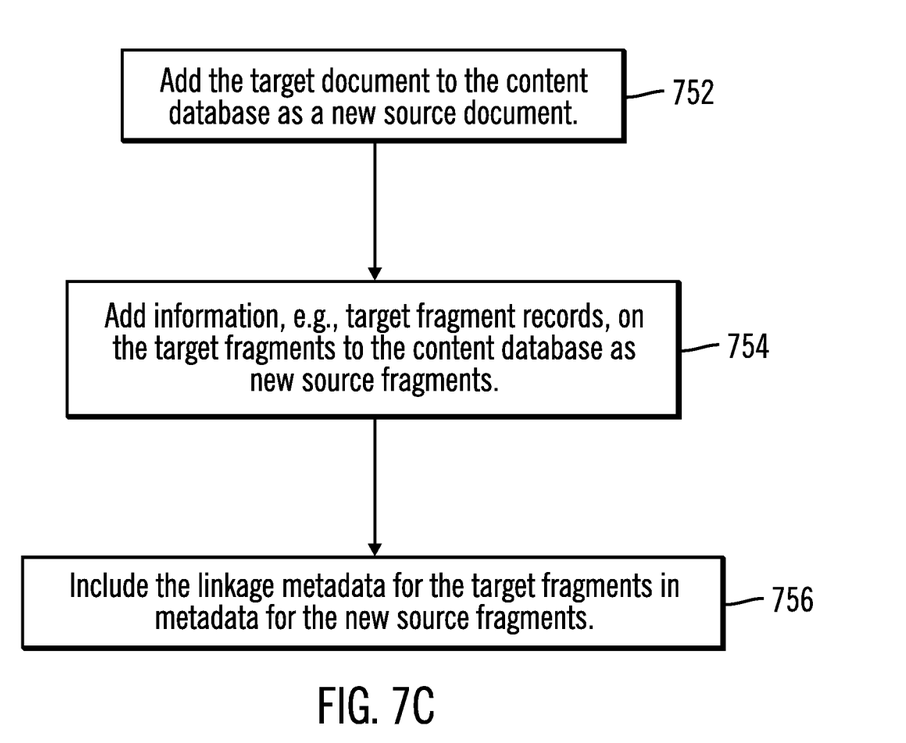

FIGS. 7a, 7b, 7c illustrate an embodiment of operations performed by the content analyzer 112 to determine whether a received target document 110 has target fragments matching source fragments in source documents 114, thus indicating that portions of the target document 110 are based on confidential or previously created documents. Upon receiving (at block 700) the target document 110 to consider for copying, the content analyzer 112 generates (at block 702) a target document fingerprint 404 based on all the content of the target document 110 and creates a target document record $400_i$ (FIG. 4) for the target document 110. The content analyzer 112 parses (at block 704) the target document 110 to determine target fragments, such as by using lexical analysis. This fragmentation operation may use the same algorithm used at block 604 to parse the source documents. For each determined target fragment i, the content analyzer 112 performs the operations at blocks 706-718. At block 708, the content analyzer 112 calculates a target fragment i fingerprint 506 and determines (at block 710) whether the calculated target fragment i fingerprint 506 matches one source fragment fingerprint 308 for one source document 304 in the content database 116. If not, i.e., the target fragment does not match one of the source fragments, then the content analyzer 112 generates (at block 712) information, such as a target fragment record $500_i$, for the target fragment indicating there is no matching source fragment. If (from the yes branch of block 710) the target fragment i matches one source fragment, then the content analyzer 112 generates (at block 714) a target fragment record $500_i$ for the target fragment indicating the matching source fragment 302. In certain operations, the target fragment fingerprint may match multiple source fragments in multiple source documents 114. The generated target fragment record $500_i$ is added (at block 716) to the target document record in field 408 for the target document record $400_i$.

After generating target fragment records 500, control proceeds to block 730 in FIG. 7b where a loop of operations is performed at blocks 730 through 750 for each target fragment i matching one of the source fragments. Within the loop performed for each target fragment i, a nested loop is performed at blocks 732 through 738 for each target fragment metadata 508 attribute. The content analyzer 112 determines (at block 734) whether there are at least two fragments of the target fragment i and matching source fragments from different source documents (e.g., at least two fragments that are members of the set of fragments including the target fragment i and matching source fragments) that have a same value for the metadata attribute j. If so, then the content analyzer 112 generates (at block 736) linkage metadata $512_j$ in the target fragment record $500_i$ associating the at least two fragments (of the target fragment i and matching source fragments) having the matching metadata attribute value $514_j$. If (at block 734) there are no two matching fragments having the matching metadata attribute j value, then control proceeds to block 738 to consider the next metadata attribute.

For instance, if metadata attribute j comprises an author, then the target fragment and/or source fragments associated with the linkage metadata all have the same author, same document source, same language. In this way, the target fragment and/or matching source fragments maybe grouped into linkage metadata for a particular metadata attribute. This linkage information may then provide a linkage of the target fragments to source fragments in a same document or from a same author.

After generating all the associations or groups of matching target and source fragments having a same metadata attribute value, the content analyzer 112 may generate (at block 740) for each linkage metadata 512, a visualization of linkages among source documents including the target fragments in the linkage metadata and a visualization of a linkage from the target fragment i to the linked source documents for the linkage metadata. In this way, a user may observe linkages of a target fragment in the target document to source documents having a source fragment matching the target fragments and linkages according to different metadata attributes of the source documents having the matching source fragments.

The content analyzer 112 may determine (at block 742) timestamps of the matching source fragments in the source fragment metadata 310 and generate (at block 744) metadata linkages among the linked source documents an ordering of the source documents according to the timestamps of the matching source fragments. In this way, the order of the source documents having a matching source fragment is shown based on the temporal order of the copied or matching source fragments.

The content analyzer 112 may further determine (at block 746) if there is one matching source fragment in at least two linkage metadata instances, i.e., having metadata attribute values matching two linkages $512_i$. If so, then a visualization is generated (at block 748) linking the source fragment in two different linkage metadata instances for different attributes, such as by visualizing a connection between the source document including the source fragment in two linkage metadata instances.

After processing all the target fragments, control may proceed to block 752 in FIG. 7c where the content analyzer 112 adds the target document 110 being considered to the content database 116 as a new source document 114. The generated target fragment records $500_i$ on the target fragments are added (at block 754) to the content database 116 as new source fragments records 300. The content analyzer 112 further adds (at block 756) the determined linkage metadata information for the target fragments $500_i$ in linkage metadata for the new source fragments $300_i$. In this way, the linkage metadata of the source fragments includes information on how that source fragment is linked to or is copied from other source fragments in earlier source documents. This allows target fragments of a new target document to be linked to multiple source fragments in multiple source documents, thereby showing a lineage.

Figure 8:
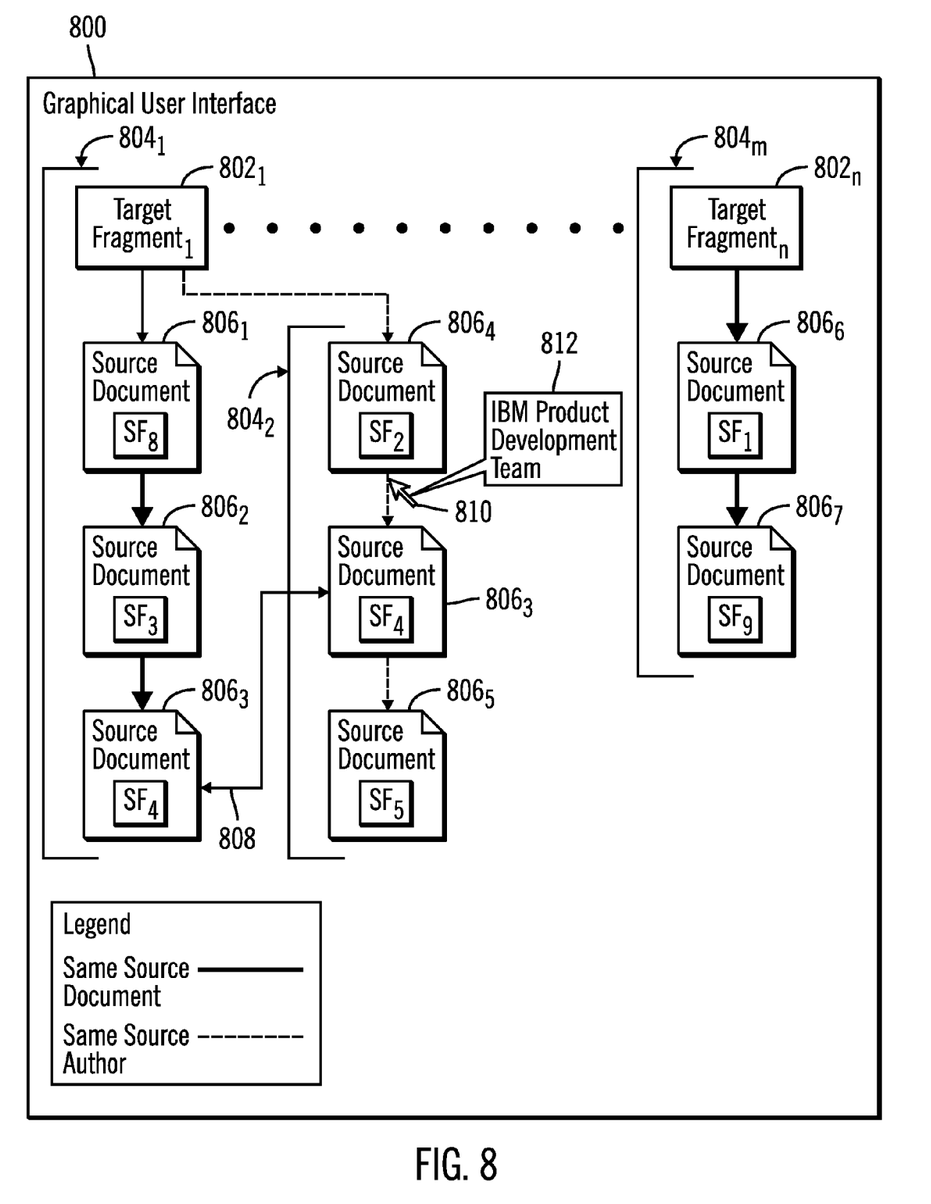
FIG. 8 illustrates an embodiment of a computer system in which embodiments may be implemented.

FIG. 8 illustrates an example of a graphical user interface (GUI) 800 rendered in a computer display at the server 102 or client 104, provide a graphical representation of the linkage metadata of the target fragments $802_1, \ldots 802_n$, where there are n target fragments in the target document 118. A first linkage metadata $804_1$ is shown of source documents $806_1, 806_2, 806_3$ and their source fragments $SF_8$, $SF_3$, and $SF_4$ that match the target fragment $802_1$, where the source fragments are from a same ultimate source document, such as $806_3$. A second linkage metadata $804_2$ is shown of source documents $806_4, 806_3, 806_5$ and their source fragments $SF_2$, $SF_4$, and $SF_5$ that match the target fragment $802_1$, where the source fragments are from source documents having the same author. Further, a linkage is shown 808 of source fragments $SF_4$ in two linkage metadata groups $804_1$ and $804_2$, thus showing a further relationship of how a matching source fragment $SF_4$ was copied from the source documents. An mth linkage metadata instance $804_m$ is shown of source documents $806_6$ and $806_7$ and their source fragments $SF_1$ and $SF_9$ that match the target fragment $802_n$, where the target fragment $802_n$ and source fragments are from source documents having the same ultimate source document. There may be a different number of linkage metadata instances m and target fragments n, i.e., m and n may differ or be the same integer value. Further, in certain embodiments, moving a mouse cursor 810 over the shown linkage between source documents $806_4$ and $806_3$ displays the metadata value 812 for that linkage, such as the author of the source document having the matching source fragments. Further, the source documents in the linkages may be ordered according to timestamps of the source fragments or source documents.

Described embodiments provide techniques for determining fragments in a target document that are copied from or match source fragments in source documents in a content database. Further, metadata for the matching source fragments is considered to determine linkage metadata of at least two fragments of the target and matching source fragment based on the metadata of the matching fragments. In this way, linkages of the fragments of the target documents that were improperly copied may be shown to provide the user with additional useful information, like the author in the source fragments that match the target fragments.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 9:
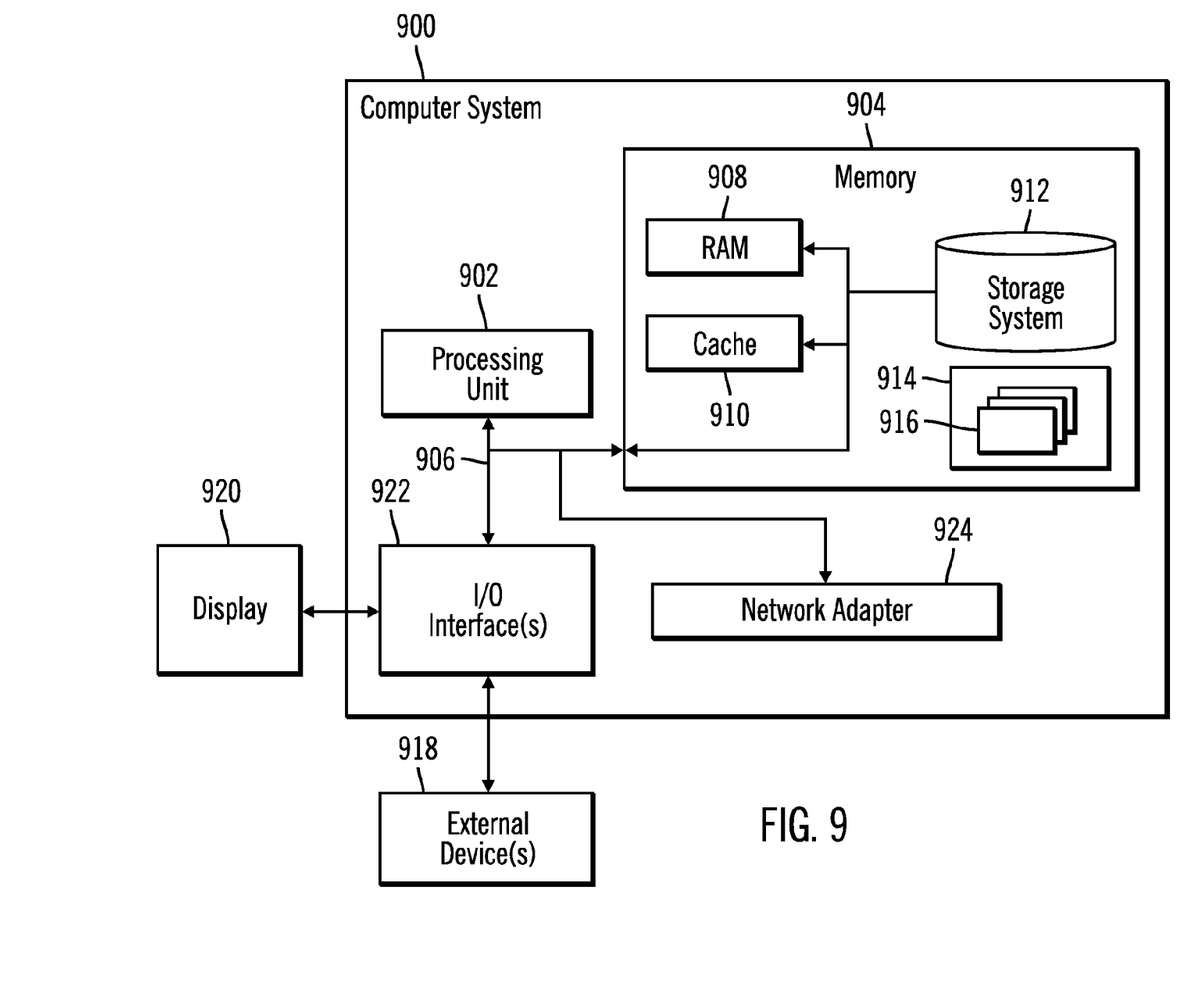
FIG. 9 illustrates an embodiment of a computer system.

The server 102 and client 104 systems in the computing environment of FIG. 1, including the user interface 108 and content analyzer 112 may be implemented in one or more computer systems, such as the computer system 900 shown in FIG. 9. Computer system/server 900 may be described in the general context of computer system executable instructions, such as program modules, being executed by a computer system. Generally, program modules may include routines, programs, objects, components, logic, data structures, and so on that perform particular tasks or implement particular abstract data types. Computer system/server 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 900 is shown in the form of a general-purpose computing device. The components of computer system/server 900 may include, but are not limited to, one or more processors or processing units 902, a system memory 904, and a bus 906 that couples various system components including system memory 904 to processor 902. Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 900 typically includes a variety of computer system readable media. Such media may be any available media that is accessible by computer system/server 900, and it includes both volatile and non-volatile media, removable and non-removable media.

System memory 904 can include computer system readable media in the form of volatile memory, such as random access memory (RAM) 908 and/or cache memory 910. Computer system/server 900 may further include other removable/non-removable, volatile/non-volatile computer system storage media. By way of example only, storage system 912 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. As will be further depicted and described below, memory 904 may include at least one program product having a set (e.g., at least one) of program modules that are configured to carry out the functions of embodiments of the invention.

Program/utility 914, having a set (at least one) of program modules 916, may be stored in memory 904 by way of example, and not limitation, as well as an operating system, one or more application programs, other program modules, and program data. Each of the operating system, one or more application programs, other program modules, and program data or some combination thereof, may include an implementation of a networking environment. The components of the server 102 and client 104 may be implemented as program modules 916 which generally carry out the functions and/or methodologies of embodiments of the invention as described herein. The content analyzer 112 may be implemented in one or more computer systems 900, where if implemented in multiple computer systems 900, then the computer systems may communicate over a network.

Computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such communication can occur via Input/Output (I/O) interfaces 922. Still yet, computer system/server 900 can communicate with one or more networks such as a local area network (LAN), a general wide area network (WAN), and/or a public network (e.g., the Internet) via network adapter 924. As depicted, network adapter 924 communicates with the other components of computer system/server 900 via bus 906. It should be understood that although not shown, other hardware and/or software components could be used in conjunction with computer system/server 900. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, fragment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a non-transitory computer readable storage medium having computer readable program code embodied therein that when executed by a computer performs operations, the operations comprising:
   in response to a determination that a target fragment in a target document matches a source fragment in a source document, generating a linkage metadata for the target fragment, wherein the linkage metadata is generated for target fragments from the target document and source fragments from multiple source documents to provide information on how the target fragments in the target document relate to the source documents having matching source fragments, wherein the source documents have content to compare against received target documents.

2. The computer program product of claim 1, wherein the linkage metadata is based on a metadata attribute from at least one of source document metadata, source fragment metadata, source fragment specific metadata, target document metadata, target fragment metadata, and target fragment specific metadata.

3. The computer program product of claim 1, wherein the linkage metadata associates at least two fragments that are members of a set of fragments comprising the target fragment and at least one matching source fragment that have a same value for a metadata attribute.

4. The computer program product of claim 3, wherein the linkage metadata indicates at least one source fragment matching the target fragment that is associated in a linkage metadata for a source fragment.

5. The computer program product of claim 3, wherein one of the at least one matching source fragment is associated in multiple linkage metadata instances for the target fragment, wherein the multiple linkage metadata instances are based on different metadata attributes.

6. The computer program product of claim 3, wherein linkage metadata instances associate at least two source documents having at least two matching source fragments.

7. The computer program product of claim 6, wherein the operations further comprise:
   generating, for target fragments each having at least one linkage metadata instance, a visualization of the at least one linkage metadata instance of the target fragment to the at least two source documents including the matching source fragments associated in the at least one linkage metadata instance.

8. The computer program product of claim 7, wherein the operations further comprise:
   determining an order of the at least two matching source fragments in one of the at least one linkage metadata instance based on timestamps of the at least two matching source fragments, wherein the generating the visualization for the at least one linkage metadata instance comprises generating a visualization of the at least two source documents including the at least two matching source fragments in the linkage metadata instance based on the determined order.

9. The computer program product of claim 1, wherein the operations further comprise:
   adding the target document to a content database as a new source document;
   adding information on the target fragment to the content database as a new source fragment; and including information on the linkage metadata for the target fragment in linkage metadata for the new source fragment.

10. A computer program product for maintaining a database of source documents, the computer program product comprising a non-transitory computer readable storage medium having computer readable program code embodied therein that when executes performs operations, the operations comprising:
for a plurality of received source documents having content to compare against received target documents, determining fragments of content in the received source documents;
calculating a fingerprint for each of the determined fragments;
determining metadata for the determined fragments, wherein the determined metadata includes fragment specific information providing additional information from metadata for the source documents including the determined fragments; and
associating with each determined fragment the calculated fingerprint and the determined metadata, wherein the database stores, for the each determined fragment, the associated calculated fingerprint and the determined metadata.

11. The computer program product of claim 10, wherein the metadata for each of the determined fragments includes at least one of metadata for the received source document and metadata specific to the determined fragment.

12. A system comprising:
a processor; and
a computer readable storage medium having code executed by the processor for performing operations, the operations comprising:
in response to a determination that a target fragment in a target document matches a source fragment in a source document, generating a linkage metadata for the target fragment, wherein the linkage metadata is generated for target fragments from the target document and source fragments from multiple source documents to provide information on how the target fragments in the target document relate to the source documents having matching source fragments, wherein the source documents have content to compare against received target documents.

13. The system of claim 12, wherein the linkage metadata is based on a metadata attribute from at least one of source document metadata, source fragment metadata, source fragment specific metadata, target document metadata, target fragment metadata, and target fragment specific metadata.

14. The system of claim 12, wherein the linkage metadata associates at least two fragments that are members of a set of fragments comprising the target fragment and at least one matching source fragment that have a same value for a metadata attribute.

15. The system of claim 14, wherein the linkage metadata indicates at least one source fragment matching the target fragment that is associated in a linkage metadata for a source fragment.

16. The system of claim 14, wherein one of the at least one matching source fragment is associated in multiple linkage metadata instances for the target fragment, wherein the multiple linkage metadata instances are based on different metadata attributes.

17. The system of claim 14, wherein the linkage metadata associates at least two source documents having at least two matching source fragments.

18. The system of claim 17, wherein the operations further comprise:
generating, for target fragments having at least one linkage metadata instance, a visualization of the at least one linkage metadata instance of the target fragment to the source documents including the matching source fragments associated in the at least one linkage metadata instance.

19. The system of claim 18, wherein the operations further comprise:
determining an order of the at least two matching source fragments in one of the at least one linkage metadata instance based on timestamps of the at least two matching source fragments, wherein the generating the visualization for the at least one linkage metadata instance comprises generating a visualization of the at least two source documents including the at least two matching source fragments in the linkage metadata based on the determined order.

20. The system of claim 12, wherein the operations further comprise:
adding the target document to a content database as a new source document;
adding information on the target fragment to the content database as a new source fragment; and
including information on the linkage metadata for the target fragment in linkage metadata for the new source fragment.

21. A system for maintaining a database of source documents, comprising:
a processor; and
a computer readable storage medium having code executed by the processor for performing operations, the operations comprising:
for a plurality of received source documents having content to compare against received target documents, determining fragments of content in the received source documents;
calculating a fingerprint for each of the determined fragments;
determining metadata for the determined fragments, wherein the determined metadata includes fragment specific information providing additional information from metadata for the source documents including the determined fragments; and
associating with each determined fragment the calculated fingerprint and the determined metadata, wherein the database stores, for the each determined fragment, the associated calculated fingerprint and the determined metadata.

22. The system of claim 21, wherein the metadata for each of the determined fragments includes at least one of metadata for the received source document and metadata specific to the determined fragment.

* * * * *